June 2, 1964          K. M. SANO          3,135,864

CASSETTE FOR RADIOGRAPHIC FILM SHEETS

Filed July 5, 1960          3 Sheets-Sheet 1

INVENTOR
KAREL MARCEL SANO

BY *John J. Dennemeyer*
ATTORNEY

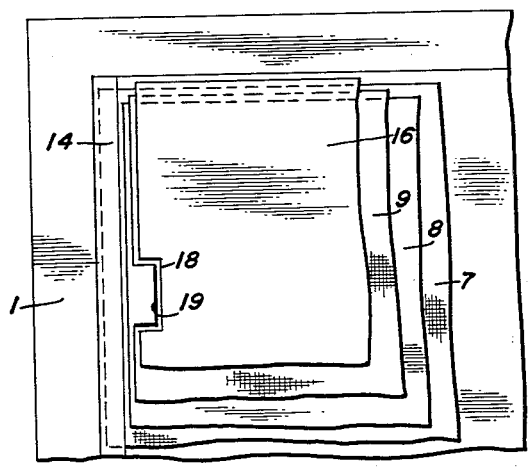
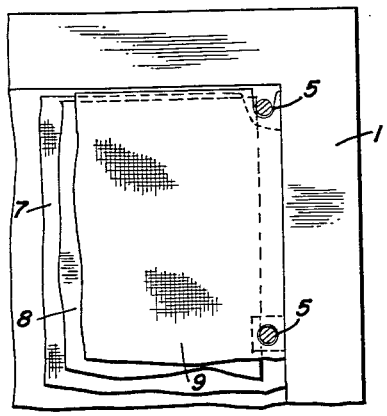
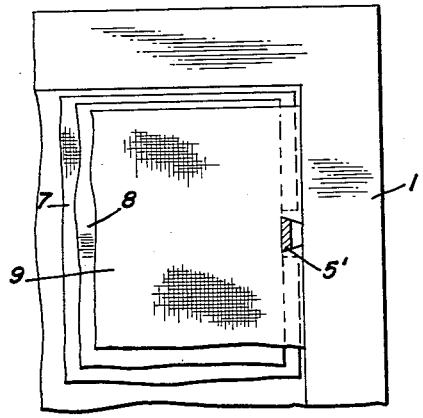

June 2, 1964 K. M. SANO 3,135,864
CASSETTE FOR RADIOGRAPHIC FILM SHEETS
Filed July 5, 1960 3 Sheets-Sheet 3

INVENTOR
KAREL MARCEL SANO

BY
ATTORNEY

United States Patent Office 3,135,864
Patented June 2, 1964

3,135,864
CASSETTE FOR RADIOGRAPHIC FILM SHEETS
Karel Marcel Sano, Borsbeek-Antwerp, Belgium, assignor to Gevaert Photo-Producten N.V., Mortsel-Antwerp, Belgium, a Belgian company
Filed July 5, 1960, Ser. No. 40,703
Claims priority, application Netherlands July 3, 1959
6 Claims. (Cl. 250—68)

This invention relates to cassettes for X-ray film sheets and more particularly to a cassette of the type in which the cassette lid is hinged to one of the cassette walls.

In this type of cassette it is preferable that the various operations, e.g., unlocking, opening, unloading and loading of the cassette be performed manually. If, however, the unlocking and opening of the cassette, and the unloading of the film sheet is performed automatically, it may occur that the individual sheets of film material will not always be dispensed readily from the opened cassette because the film material tends to adhere to the bottom of the cassette or to the hinged lid or to the intensifying screens. This tendency of the sheet material to adhere to certain parts of the cassette can be caused by the pressure of the closed cassette lid on the film sheet, by the presence of moisture within the cassette, by electrostatic charges generated by friction between various parts of the cassette and the film material or by air pressure or air suction upon opening or closing the cassette lid.

It is therefore an object of the present invention to provide means within a cassette of the type described above which are adapted to advance the film sheet with respect to the walls and bottom of the cassette when the lid is being opened thereby facilitating the dispensing of the film sheet.

It is a further object of the invention to provide means which will release any film sheet which may adhere to the bottom wall of the cassette.

In order to accomplish the above objects, the cassette lid is provided, according to the invention, with novel projections in the form of studs or pins extending inwardly from the underside of the lid and arranged to slide the film sheet forwardly in a positive manner as the lid is opened to bring the film sheet into a position where it is readily accessible. These novel studs or pins are preferably arranged in the proximity of the hinge. Additionally, the studs or pins can vary in number as well as in size.

It is also a feature of this invention that these stud members are so arranged with respect to an intensifying screen that the latter is maintained in its respective position during the opening and closing of the lid. Other features and advantages of the invention will be best understood from the description of one embodiment of the invention which is illustrated in the accompanying drawings and in which:

FIG. 5 is a fragmentary elevational view of the loaded cassette adjacent to the hinge, with the lid removed, and a section along line VI—VI' of FIG. 3;

FIG. 6 is a modification of the arrangement of FIG. 5 showing a single central stud;

FIG. 9 is a fragmentary elevational view of the loaded cassette adjacent to the locking device, with the lid removed, and a section along line VI—VI of FIG. 3.

Figure 1:
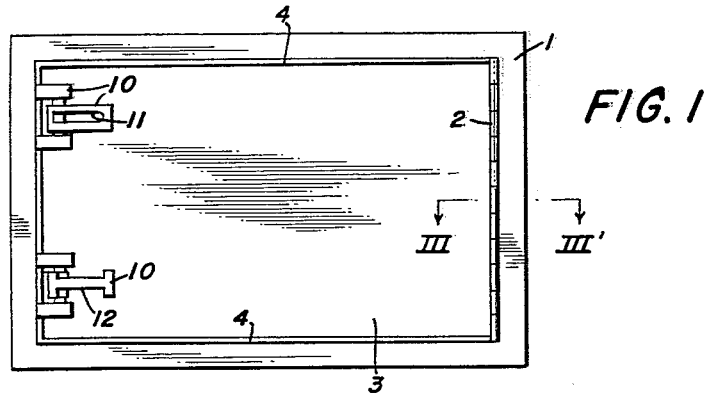
FIG. 1 is a plan view of the closed cassette according to the invention.
Figure 2:
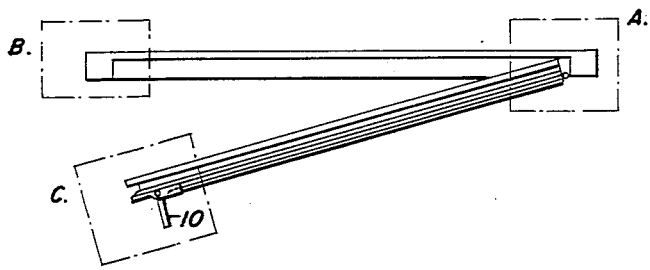
FIG. 2 is a schematic longitudinal section of the opened cassette of FIG. 1.
Figure 3:
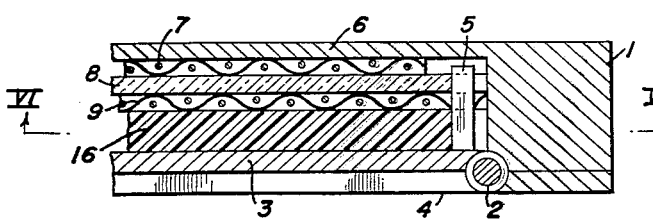
FIG. 3 is an enlarged view of part A of FIG. 2 with the lid in closed position, and a section along line III—III' of FIG. 1.
Figure 4:
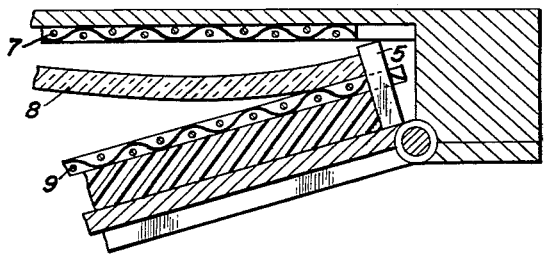
FIG. 4 is an enlarged view of part A of FIG. 2 with the lid in the open position.

Referring now to FIGURES 1 and 2 there is shown a cassette of rectangular configuration having walls 1 to which a lid 3 is connected by means of a hinge 2. As shown in the drawing, the cassette lid opens downwardly when the cassettte is in its operative position. The lid 3 has a close fit with the walls 1 so as to prevent light from entering the interior of the cassette when the lid is in the closed position. In order to increase the pressure resistance of the lid and prevent a warping or other deformation thereof, longitudinally extending reinforcing ribs 4 are provided on the surface of lid 3.

Two spaced studs 5 (FIG. 5) are fixed to the inner surface of lid 3 and hold the intensifying screen 9 in place. When lid 3 is opened, the film sheet is slid forwardly and drops down into a position where it can be easily reached either manually or by an auxiliary mechanism designed to take hold of a sheet and remove it. The front portion 15 of the film sheet 8 (FIGS. 7 and 8) is slid forwardly beyond the front edge of the intensifying screen 9 so that the latter does not interfere with the gripping and removing of the sheet material.

The lid 3 may be locked by means of two lock devices provided with tilting levers 10. The levers 10 may be provided either both with a slot 11 or with a notch 12 which can be engaged by a feeler means which does not form a part of the invention and is not shown in the drawing, and by means of which the levers may be lifted to open the locks and release the lid.

Figure 7:
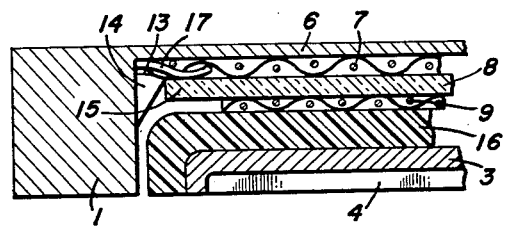
FIG. 7 is an enlarged view of a portion of the cassette identified as B in FIG. 2.
Figure 8:
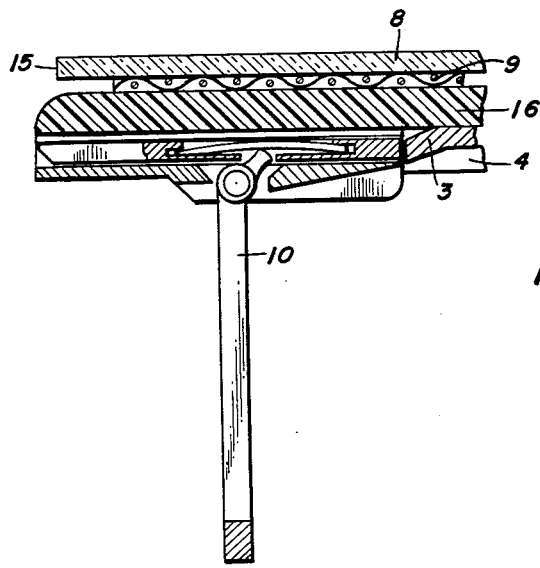
FIG. 8 is an enlarged view of a portion of the cassette identified as C in FIG. 2.

Referring now more particularly to FIG. 7, the intensifying screen 7 engages a groove 13 provided in the inner portion of the cassette wall opposite the hinge whereby this screen is held in position against the bottom 6 of the cassette. The intensifying screen 9 is provided with notches at its inner end suitable to accommodate the two spaced studs 5 (FIG. 5) or with a single notch suitable to receive a centrally arranged dovetail-shaped stud 5' (FIG. 6). Screen 9 rests against a thick layer 16 of a resilient material such as felt, by means of which the film sheet is compressed between the two intensifying screens.

According to the invention the studs or pins fixed to the inner side of the cassette lid, preferably in the proximity of the hinge member, cause the film sheet to be displaced and move forwardly as the lid is being opened. This displacement or advancement of the film sheet in a forward direction greatly facilitates its removal. As shown in FIG. 7 a sloping wall portion 14 at the inner end of the cassette wall opposite the hinge contributes in loosening and dispensing the film sheet by guiding the forward portion of the film sheet downwardly. This sliding and downward movement of the film sheet is supported additionally by small leaf springs 17 which may be arranged on the bottom inside the cassette along the front wall or in the corners. When the cassette lid is opened, these leaf springs push the front portion of the film sheet downwardly to initiate the downward movement of the film sheet and thereby make the release and forward movement of the film material considerably easier.

In the event that the cassette of the present invention is intended for use with automatic gripping apparatus, it is preferable to provide the resilient layer 16 and the intensifying screen 9 with indentations or recesses 18 and 19 which allow the gripping device unencumbered access to the film sheet.

The cassette of this invention can also be loaded by automatic means, and appropriate apparatus of this type has been described for example in my copending United States patent application, Serial No. 4,694, filed January 26, 1960.

It will be readily understood that there has beeen provided by the invention as set forth above an improved cassette for radiographic sheet material in which the stud members simultaneously facilitate the removal of the sheet material and maintain an intensifying screen in position. It is obvious that other constructions are possible, for example where the intensifying screen is mounted independently of the projections, e.g. by glueing to the resilient material, or the projections could be shaped as a bar instead of as studs, or cassettes without intensifying screens could be used. These and other modifications will suggest themselves to persons skilled in the art and it is understood that the embodiment described above is solely an illustration of the invention and not a limitation.

I claim:

1. A cassette for storing and dispensing a radiographic film sheet including a bottom wall and side walls, a lid pivotably connected to one of said side walls, said film sheet resting on said lid in the dispensing position, pusher means at the inner end of said lid and adapted to engage said film sheet inside said cassette, deflecting means mounted at the side wall opposite said one side wall and sloping from the direction of said bottom wall toward said one side wall, said pusher means engaging and moving the film sheet forwardly relative to said bottom wall and said side walls and against said deflecting means during opening of said lid.

2. A cassette for storing and dispensing a radiographic film sheet including a bottom wall and side walls, a lid pivotably connected to one of said side walls, said film sheet resting on said lid in the dispensing position, pusher means at the inner end of said lid adjacent its pivot axis and adapted to engage said film sheet inside said cassette, deflecting means mounted at the side wall opposite said one side wall and sloping from said bottom wall toward said one side wall, spring means mounted in said cassette at the side wall opposite said one side wall and adapted to engage and urge the outer end of the film sheet downwardly toward said deflecting means, said pusher means engaging and moving the film sheet forwardly relative to said bottom wall and said side walls and along said deflecting means during opening of said lid.

3. A cassette according to claim 1 wherein said pusher means consist of two stud-like members mounted in spaced relation on said lid adjacent its pivot axis.

4. A cassette according to claim 1 wherein said pusher means consist of a single stud-like member mounted substantially centrally of the lid adjacent its pivot axis.

5. A cassette according to claim 1 including radiographic screen means disposed against said lid and connected to said pusher means.

6. A cassette according to claim 1 including a first radiographic screen secured to said bottom wall and a second radiographic screen secured to said pusher means.

References Cited in the file of this patent

UNITED STATES PATENTS

| | | |
|---|---|---|
| 2,056,279 | Kulick | Oct. 6, 1936 |
| 2,878,389 | Raffman | Mar. 17, 1959 |

FOREIGN PATENTS

| | | |
|---|---|---|
| 325,682 | Germany | Sept. 23, 1920 |
| 733,761 | Great Britain | July 20, 1955 |